US008499752B2

(12) United States Patent
Bahlo et al.

(10) Patent No.: US 8,499,752 B2
(45) Date of Patent: Aug. 6, 2013

(54) METHOD TO ADAPT THE O2 SIGNAL OF AN O2 SENSOR DURING OVERRUN

(75) Inventors: Jan M. S. Bahlo, New Hudson, MI (US); Dion Tims, Waterford, MI (US); Christine I. Wettig, West Bloomfield, MI (US); Ulrich Seufert, Moeglingen (DE); Chai Kihyun, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 982 days.

(21) Appl. No.: 12/568,416

(22) Filed: Sep. 28, 2009

(65) Prior Publication Data

US 2011/0073086 A1 Mar. 31, 2011

(51) Int. Cl.
*F02D 41/00* (2006.01)
*G01N 27/417* (2006.01)
*G01M 15/10* (2006.01)
*F02D 41/14* (2006.01)

(52) U.S. Cl.
USPC .......... 123/703; 701/109

(58) Field of Classification Search
USPC .. 123/703, 672, 674, 676, 677, 688; 701/104, 701/109, 114
See application file for complete search history.

(56) References Cited

U.S. PATENT DOCUMENTS 4,991,102 A * 2/1991 Sakamoto et al. ............ 701/109
5,027,768 A 7/1991 Saegusa
5,067,461 A 11/1991 Joachim et al.
5,518,603 A 5/1996 Furuhashi et al.
5,672,817 A 9/1997 Sagisaka et al.
5,869,743 A 2/1999 Jones et al.
6,131,446 A 10/2000 Schnaibel et al.
6,279,372 B1 * 8/2001 Zhang .......................... 73/1.07

(Continued)

FOREIGN PATENT DOCUMENTS

EP 1048834 2/2000
EP 1035318 A2 * 9/2000
EP 1748173 1/2007
GB 2341687 3/2000

OTHER PUBLICATIONS

PCT Invitation to Pay Additional Fees and, Where Applicable, Protest Fee, dated Dec. 28, 2010 (6 pages).

(Continued)

*Primary Examiner* — Hieu T Vo
(74) *Attorney, Agent, or Firm* — Michael Best & Friedrich LLP

(57) ABSTRACT

A system for compensating for changes in behavior of an oxygen sensor. In one embodiment, the system includes an oxygen sensor configured to produce an output indicative of an oxygen level in an exhaust stream produced by an internal combustion engine. An electronic control unit receives the output of the oxygen sensor and is configured to cause the internal combustion engine to operate in an overrun mode. The electronic control unit is programmed or otherwise configured to determine whether a change in oxygen level over time is approximately zero. When the change in oxygen level is approximately zero or near zero, the electronic control unit determines a compensation factor for the oxygen sensor.

10 Claims, 4 Drawing Sheets

U.S. PATENT DOCUMENTS

| | | | | |
|---|---|---|---|---|
| 6,959,539 | B2 * | 11/2005 | Rosel et al. | 701/109 |
| 7,003,943 | B2 | 2/2006 | Ketterer et al. | |
| 7,367,330 | B2 * | 5/2008 | Yoshidome | 123/672 |
| 7,461,536 | B2 | 12/2008 | Schnaibel et al. | |
| 7,606,654 | B2 * | 10/2009 | Kawase et al. | 701/109 |
| 8,020,369 | B2 * | 9/2011 | Hahn | 60/285 |
| 2006/0032744 | A1 | 2/2006 | Busch et al. | |
| 2008/0110234 | A1 | 5/2008 | Odendall | |
| 2008/0262704 | A1 | 10/2008 | Kawase et al. | |
| 2009/0056313 | A1 | 3/2009 | Kama et al. | |

OTHER PUBLICATIONS

PCT International Search Report and Written Opinion for Application No. PCT/US2010/050353, dated Mar. 22, 2011 (13 pages).

Kirchoff, Rick, Oxygen Sensor Information, available online at: <http://wps.com/LPG/o2sensor.html>, pp. 1-3, Nov. 4, 1994.

Pico Technology, Lambda Sensors, All About Lambda Senors, available online at: <http://www.picoauto.com/applications/lambda-sensor.html>, pp. 1-3, at least as early as Sep. 29, 2008.

* cited by examiner

METHOD TO ADAPT THE O2 SIGNAL OF AN O2 SENSOR DURING OVERRUN

BACKGROUND

The present invention relates to a method of calibrating O2 sensors used in the exhaust systems of internal combustion engines. More particularly, the invention relates to Zirconia-based O2 sensors, such as those used in diesel exhaust systems.

In general, internal combustion engines need a specific air-to-fuel ratio (or ratio range) to operate correctly. For gasoline engines, the ideal ratio is 14.7 parts of air to one part of fuel. When the ratio is less than 14.7, not all fuel in the air-fuel mixture is burned or combusted. This situation is referred to as a rich mixture or rich condition and has a negative impact on exhaust emissions because the leftover fuel becomes pollution in the form of hydrocarbons ("HCs") and carbon monoxide ("CO"). When the air-fuel ratio is less than 14.7, excess oxygen is present in the air-fuel mixture. This situation is referred to as a lean mixture or lean condition. When an engine burns lean, it produces nitrogen-oxide pollutants and, in some cases, engine performance decreases, engine damage occurs, or both events occur.

In modern engines, the air-fuel mixture is controlled, in part, through use of an O2 sensor. The O2 sensor communicates with an engine control unit in a feedback loop which typically either controls a fuel quantity or an Exhaust Gas Recirculation ("EGR") rate. In some engines, the engine control unit uses the O2 sensor's input to adjust the fuel mixture. The O2 usually sensor measures the oxygen level inside the exhaust manifold.

The performance of an O2 sensor degrades when its exhaust gas inlets ports become fouled or blocked. This blockage could occur due to being coated with oil or by being covered with an exhaust by-product such as soot. The performance of an O2 sensor can also degrade due to age. Typically, when a sensor ages it produces an incorrect signal or no signal at all. A properly operating O2 sensor (e.g., one used in a gasoline engine, located upstream of the catalytic converter, and not aged or contaminated or blocked by soot or other combustion by-products) should fluctuate between a rich and lean mixture at least once a second to keep the amount of harmful emissions low. A properly working O2 sensor in a diesel application should provide an output or reading that changes with changes to engine loading (within a reasonable amount of time).

The result of aging in a Zirconia-based O2 sensor is typically manifested in signal drift and incorrect sensor readings. To compensate for signal drift, an overrun adaptation is used. "Overrun" refers to a situation in which a vehicle's exhaust pipe is purged with air from outside the engine. As is known, atmospheric air has an oxygen content of about 21%. If an O2 sensor reading (after signal pressure compensation) in overrun differs from 21%, the engine control unit assumes that the deviation is due to aging of the sensor. The common procedure is to compensate for this signal deviation by determining a correction factor which is then applied to all following readings. In the next overrun cycle, the correction factor can be trimmed or adjusted to account for sensor aging between the current and past overrun cycles.

SUMMARY

One challenge associated with compensating for O2 sensor signal errors relates to the time needed to completely purge the exhaust pipe from combustion gases to make sure that the sensor reading in overrun is not initiated too early. Exhaust gas residue could lead to an incorrect O2 reading (e.g., an O2 level below 21%) and, as a consequence, the correction factor could be based on an incorrect calibration point. A common technique used to determine the timing of reading an O2 signal involves determining the amount of the gas or air that is required to purge the exhaust pipe from exhaust gas residue. To determine the amount of purge air, an O2 measurement is used during the calibration phase. The required purge air mass is the mass that has been pumped through the pipe until the O2 reading of an oxygen sensor results in a stable signal. This amount of purge gas is calibrated and is fixed thereafter. As a consequence, the calibration is static and can not adapt dynamically based on changes that may occur in the operation of the O2 sensor or another engine component (e.g., a stuck or jammed EGR valve).

Since the time to stabilize on O2 sensor signal typically also depends on clogging residues in the sensor's protection tube, current calibration techniques employ a safety factor that reflects a relatively slow sensor dynamic (which might result, e.g., from a soot-clogged sensor-protection tube or poisoning that affects the sensor electrodes pumping capabilities or diffusion barriers). These side effects can significantly change the required amount of purge gas. As a consequence, it is hard to decide how big the safety factor must be to cover all possible aging effects. If the purge air mass is estimated too low by the calibrator, the incorrect estimate can lead to significant errors in the O2 reading and, therefore, negatively impacts emissions and component aging. The situation may also interfere with on-board diagnostics. If the purge air mass is estimated too high the system may never be able to compensate for signal drift. This depends on the driver's driving behavior in a case where the engine does not stay in "overrun" long enough to calculate a new O2 compensation factor. Also, this would affect on-board diagnostics and could also affect emissions Another problem with many compensation techniques is that they actually operate less optimally when new sensors are monitored. Generally, the adaptation trigger (purge air mass) for the compensation process is based on the signal response of aged parts. As a consequence, when a new sensor is used, the system has to wait relatively long periods of time to determine the new correction factor. This can be critical for the very first adaptation at or after what is know as the "end-of-line" ("EOL") stage of vehicle production, since an initial adaptation is typically required to release the O2 sensor signal for system usage. In other words, engine control systems in the vehicle will either ignore or not receive the signal from the O2 sensor unless an adaptation has occurred. Thus, there is a risk that after EOL, cars could be driven without any active O2-sensor signal because the driver doesn't operate the vehicle in situations that meet the purge gas threshold during overrun phases or because turnover time in vehicle production doesn't allow a long enough roller-dyne-testing to have the sensor signal initially calibrated.

Instead of calculating or guessing an amount of required purge gas to release the O2 signal adaptation, embodiments of the invention monitor the stability of the O2 sensor during overrun directly. If the signal slope ($\Delta O2/\Delta t$) of the pressure compensated O2 sensor signal becomes (or is close to) zero, the O2 sensor signal is considered to be stable and signal adaptation is initiated. Slope monitoring increases the reliability the sensor adaptation, since such monitoring inherently compensates or accounts for fouling and aging of the sensor (soot clogging, electrode poisoning, diffusion barrier plugging) as well as effects that might lead to long purge gas poisoning (engine blow-by, clogged exhaust gas recirculation valves, etc.).

In one embodiment, the invention provides a system for compensating for changes in behavior of an oxygen sensor. The system includes an oxygen sensor configured to produce an output indicative of an oxygen level in an exhaust stream produced by an internal combustion engine. An electronic control unit receives the output of the oxygen sensor and is configured to cause the internal combustion engine to operate in an overrun mode. The electronic control unit is programmed or otherwise configured to determine whether a change in oxygen level over time is approximately zero. When the change in oxygen level is approximately zero or near zero, the ECU determines a compensation factor for the oxygen sensor.

Embodiments of the invention may be implemented to provide various benefits, including improving automatic transmission calibration ("ATC") control. As noted, past methods for purging exhaust systems relied on fixed amounts of purge gas and fixed amounts of time. Both of these techniques require safety margins that are accounted for during calibration. The safety margins change for different vehicles, and unless they are calculated correctly, the risk for calibrating the wrong values during overrun is relatively high when using static purge techniques. If the calibration is incorrect, a complete purge may not be achieved. In a vehicle with an automatic transmission, when a driver releases the gas pedal (or accelerator), the automatic transmission opens up (or disengages) the clutch and fuel is injected so that the engine idles and overrun is not entered. If no overrun occurs or the length of overrun is short, the exhaust system is not completely purged and the oxygen sensor is not properly calibrated.

Embodiments of the invention can also be used to address challenges in exhaust gas recirculation ("EGR") control strategies. In some vehicles, the EGR valve is kept open all or most of the time to help ensure complete combustion of fuel. However, if the EGR valve is kept open during overrun more air is needed to properly purge the exhaust system. This is so because when the EGR valve is open the volume of the exhaust system increases, so more air is needed to purge the system.

Some vehicles have large exhaust pipes which cause less gas to pass by the oxygen sensor in a given amount of time. While purging an exhaust system, with a large exhaust pipe or one that has lower exhaust speeds, the process can be lengthened because of the flow of gas past the sensor. By implementing an embodiment of the invention, it is possible to release O2 signal adaptation in a more reliable manner than with at least some of the currently used techniques. This is because the embodiment automatically compensates for non-linear or unexpected signal response behavior of the sensor resulting from varying air flow speeds. Slow or unpredictable O2 sensor response time can impact tailpipe emission levels. Thus, monitoring the dynamic behavior of an O2 sensor can be made part of the on-board diagnostic ("OBD") system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
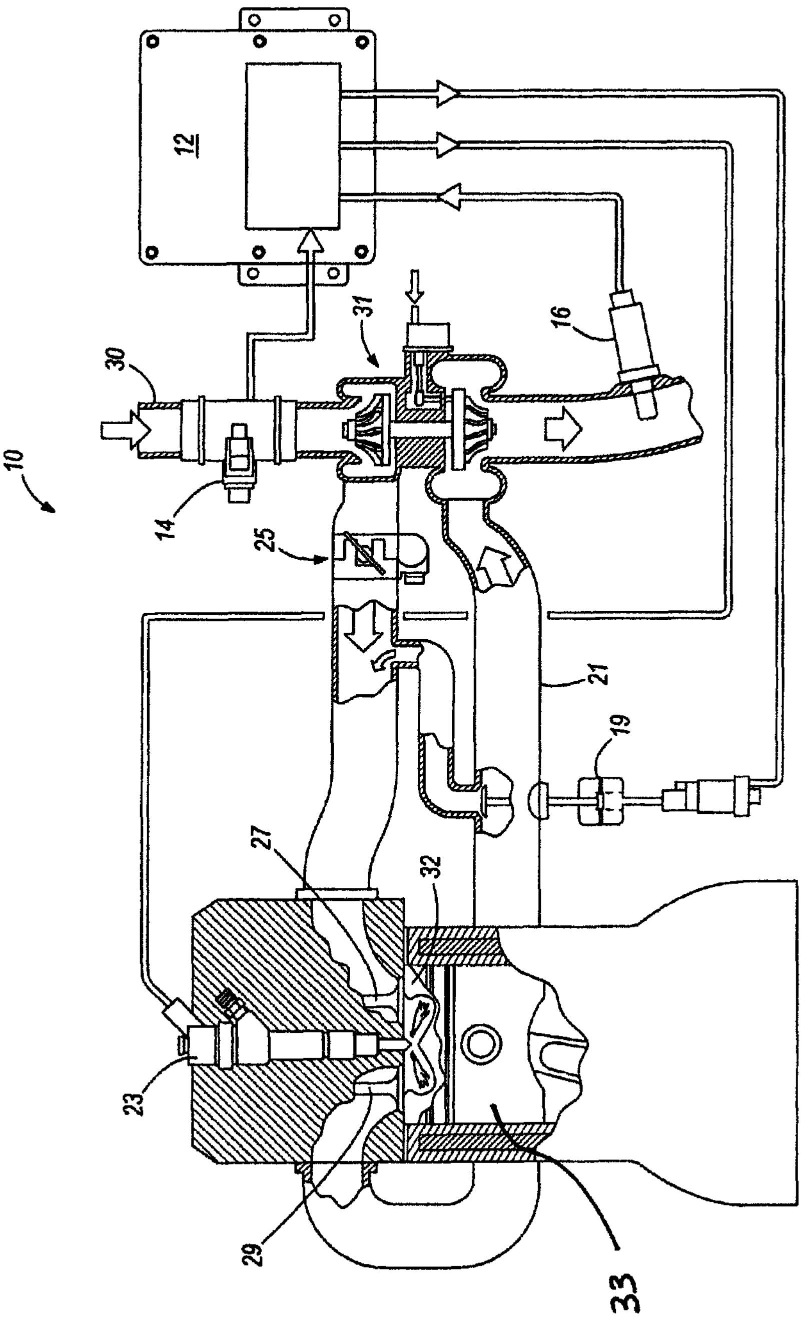
FIG. 1 schematically illustrates a diesel engine system.

FIG. 1 illustrates a diesel engine 10 that is controlled by an electronic control unit ("ECU") 12. For the sake of simplicity, only one cylinder of the engine 10 is shown in FIG. 1. However, a typical engine includes multiple cylinders and, as a consequence, also includes duplicates of other components illustrated in the drawing such as fuel injectors, valves, and the like. The ECU 12 receives information from a mass air flow ("MAF") sensor 14 and an O2 sensor 16. The O2 sensor produces an electric signal or output that is correlated to the amount of oxygen measured by the sensor. The engine includes an exhaust gas recirculation ("EGR") valve 19, an exhaust manifold 21, a fuel injector 23, and a throttle or throttle valve 25. The ECU 12 sends data and instructions to the EGR valve 19 and fuel injector(s) 23. Air from outside the engine 10 enters intake manifold 30 and, in the embodiment shown, is forcefully drawn into the engine by a turbo 31. Air flows past the throttle valve 25 (when the throttle valve is open), past an intake valve 27 (when it is open), and into a cylinder 32. A piston 33 moves up and down within the cylinder 32. The fuel injector controls delivery of fuel to the cylinder 32 and fuel from the fuel injector 23 is mixed with the air in the cylinder 32 and combusted or burned. Exhaust or exhaust gases from combustion flow out of the cylinder 32 past an exhaust valve 29 (when it is open) into exhaust manifold 21.

While a vehicle is in operation, exhaust or exhaust gases (or, in other words, an exhaust stream) pass (or passes) the O2 sensor 16. The ECU 12 continuously tests for lean and rich mixture conditions based on information from the O2 sensor 16. Based on the measured oxygen content, the ECU 12 adjusts the EGR valve position. The ECU 12 also controls operation of the fuel injector 23 and may send a command signal to reduce or increase the amount of fuel injected into the cylinder 32 depending on whether too rich or too lean a condition exists in comparison to the desired state.

During overrun, no fuel is delivered to the engine 10. In other words, to operate the engine in an overrun mode, the ECU sends a command signal to the fuel injectors to turn off or otherwise operate so that the fuel injectors deliver no fuel to the engine. In the overrun mode, piston 33 continues to move. As a consequence, the engine acts like an air pump. Intake valve 27 and exhaust valve 29 are operated in overrun and outside air passes through cylinder 32 and into exhaust manifold 21. Once outside air reaches exhaust manifold 21, the oxygen level is sensed by the O2 sensor 16. The overrun process continues until the level of oxygen sensed by the O2 sensor is approximately 21% (or, more precisely, 20.95%). When this O2 level is reached, it is assumed that the exhaust manifold has been purged of exhaust gases and residues.

Figure 2:
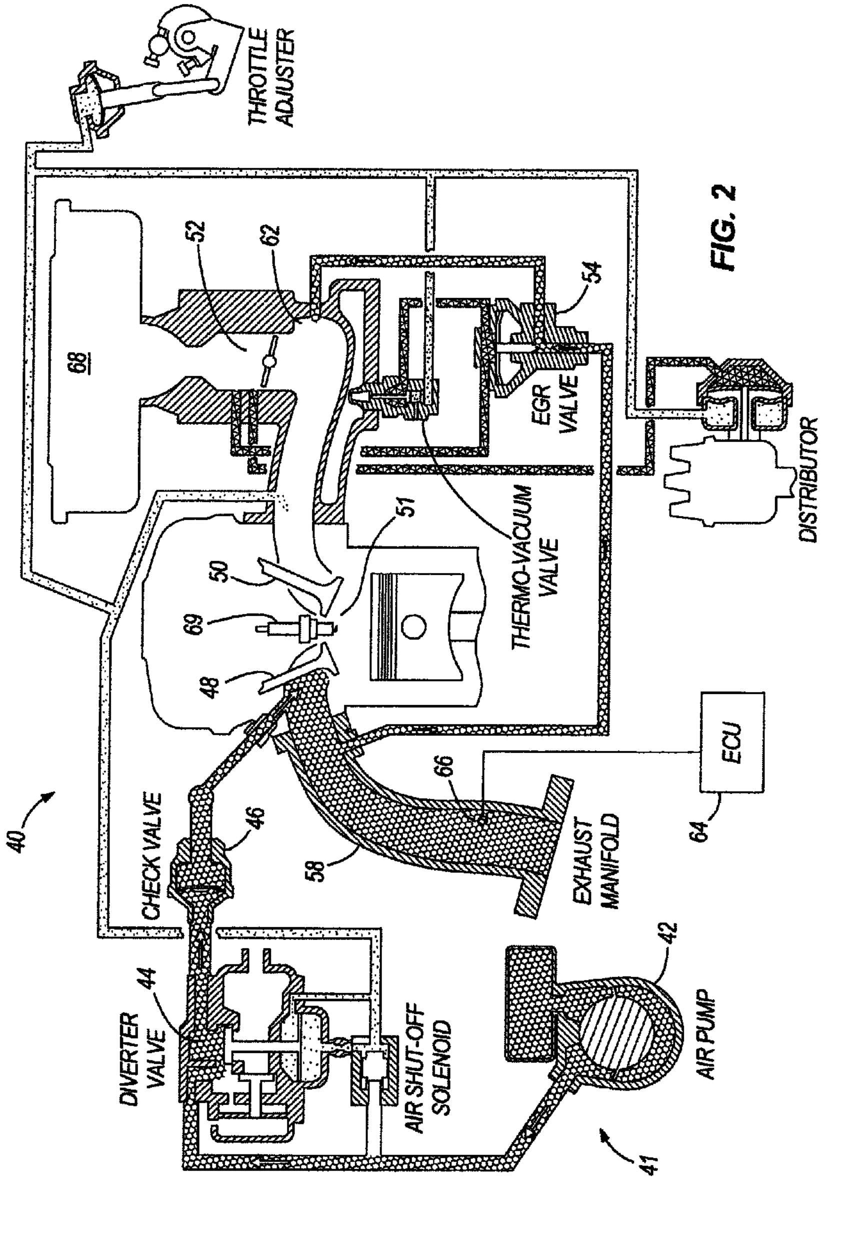
FIG. 2 schematically illustrates a gasoline engine system.

The turbo diesel engine 10 in FIG. 1 is just one type of engine in which adapting the O2 signal of an O2 sensor during overrun can occur. FIG. 2 illustrates a gasoline engine 40 in which embodiments of the invention may be implemented or utilized. The gasoline engine 40 includes an air injection system 41. The air injection system 41 includes an air pump 42, a diverter valve 44, and a check valve 46. The engine 40 includes an exhaust valve 48, an inlet valve 50, a cylinder 51, a throttle valve 52, an exhaust gas recirculation valve 54, an exhaust manifold 58, and an inlet manifold 62. The engine also includes an ECU 64 and an O2 sensor 66.

In normal operation, air flows from an air cleaner 68, past the throttle valve 52, into the inlet manifold 62. Fuel is mixed with the air and the resulting air-fuel mixture is combusted in the cylinder 51. Combustion is triggered by a spark from a spark plug 69. Exhaust gases generated as a result of combustion flow pass the exhaust valve 48 into the exhaust manifold 58. The O2 sensor 66 is located in the exhaust manifold 58 and senses the level of oxygen in the exhaust.

As with the diesel engine 10, the gasoline engine 40 purges its exhaust manifold during overrun. Outside air is delivered to the exhaust manifold 58 and the level of oxygen is sensed by the O2 sensor 66. Once the O2 sensor 66 has detected an oxygen level of about 21%, the ECU 64 assumes that the exhaust manifold has been purged of exhaust gases.

Figure 3:
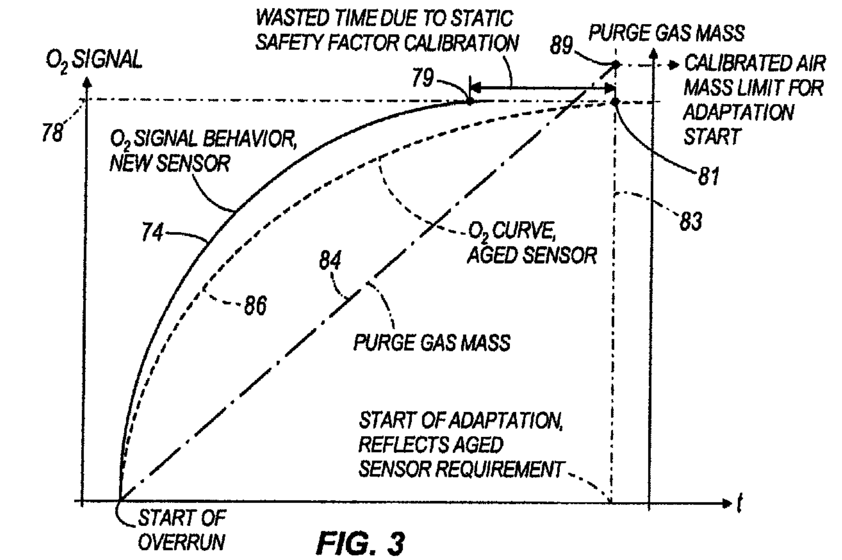
FIG. 3 graphically illustrates the behavior of an O2 sensor, a prior-art adaptation technique, and wasted time or delay during calibration of an aged sensor.

FIG. 3 graphically illustrates some of the deficiencies that have been observed in current adaptation methods. The graph shows the signal behavior of a new O2 sensor and an aged O2 sensor versus time. The behavior of the new O2 sensor is shown with a solid line (or, more appropriately, curve) 74. The behavior of the old O2 sensor is shown with a dashed line (or curve) 76. Behavior line 78 represents an O2 level of approximately 21%, which (as noted) is the level of oxygen that indicates a successful overrun purge of the exhaust manifold. Point 79 represents the time at which the new sensor reaches the desired O2 level (i.e., the level indicated by line 78). Point 81 represents the time at which the aged sensor reaches the desired O2 level (again, the level demarcated by line 78).

Vertical line 83 indicates the start of adaptation for an aged sensor. Line 84, which has a constant slope (and is shown as a dot and dash pattern), represents the purge gas mass (i.e., the mass of the gas that flows through the exhaust manifold during overrun until a reading of 21% is achieved). Point 89 represents the calibrated air mass limit or threshold at which adaptation starts. The distance from point 79 to point 83 represents a delay or “wasted adaptation release time” due to the negative effects of aging in a sensor.

Figure 4:
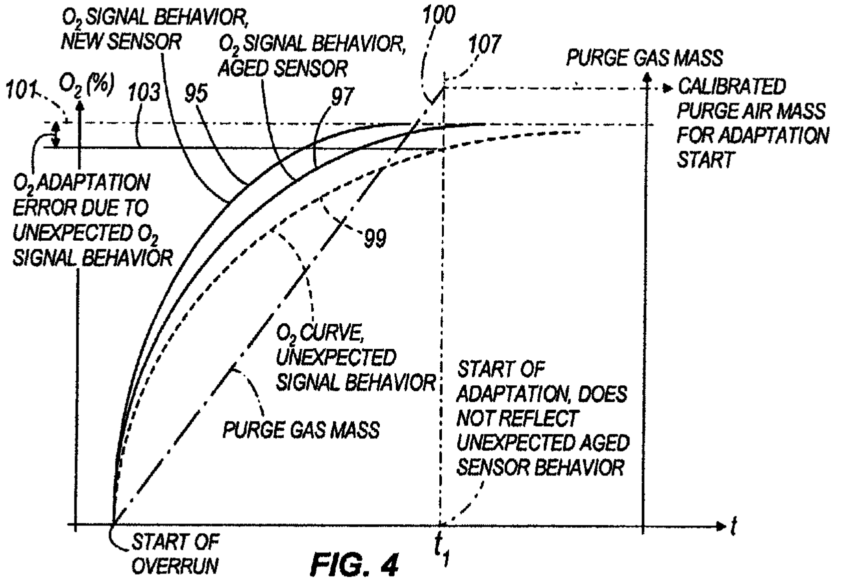
FIG. 4 graphically illustrates the behavior of an O2 sensor and the risk of incorrect calibration caused by unexpected signal response.

FIG. 4 graphically illustrates the calibration error that may be caused by signal response time delay. Signal response delay can be caused by a clogged exhaust gas recirculation valve or a clogged or fouled O2 sensor among other things. The graph shows signal behavior for a new O2 sensor, an aged O2 sensor, and an O2 sensor displaying unexpected behavior. The behavior of the new O2 sensor is shown by curve 95, the behavior of the aged O2 sensor is shown by curve 97, and the behavior of the O2 sensor operating unexpectedly is shown by curve 99. Line 100 represents the purge gas mass (calibrated in the engine controller) and line 101 represents the O2 level at the end of an overrun.

Line 103 indicates the O2 level at which the sensor displaying unexpected behavior begins calibration. Vertical line 107 indicates the start of adaptation (at a time t1) for an aged sensor (or a sensor that is not displaying unexpected behavior). The distance between lines 101 and 103 is an indication of an O2 adaptation error due to unexpected signal behavior. Since the adaptation begins at time t1, the sensor does not communicate to the control unit (e.g., ECU 12 or 64) that it is misreading the amount of oxygen in the gases present in the exhaust manifold since the start of adaptation relies solely on the fixed, calibrated purge air mass.

Figure 5:
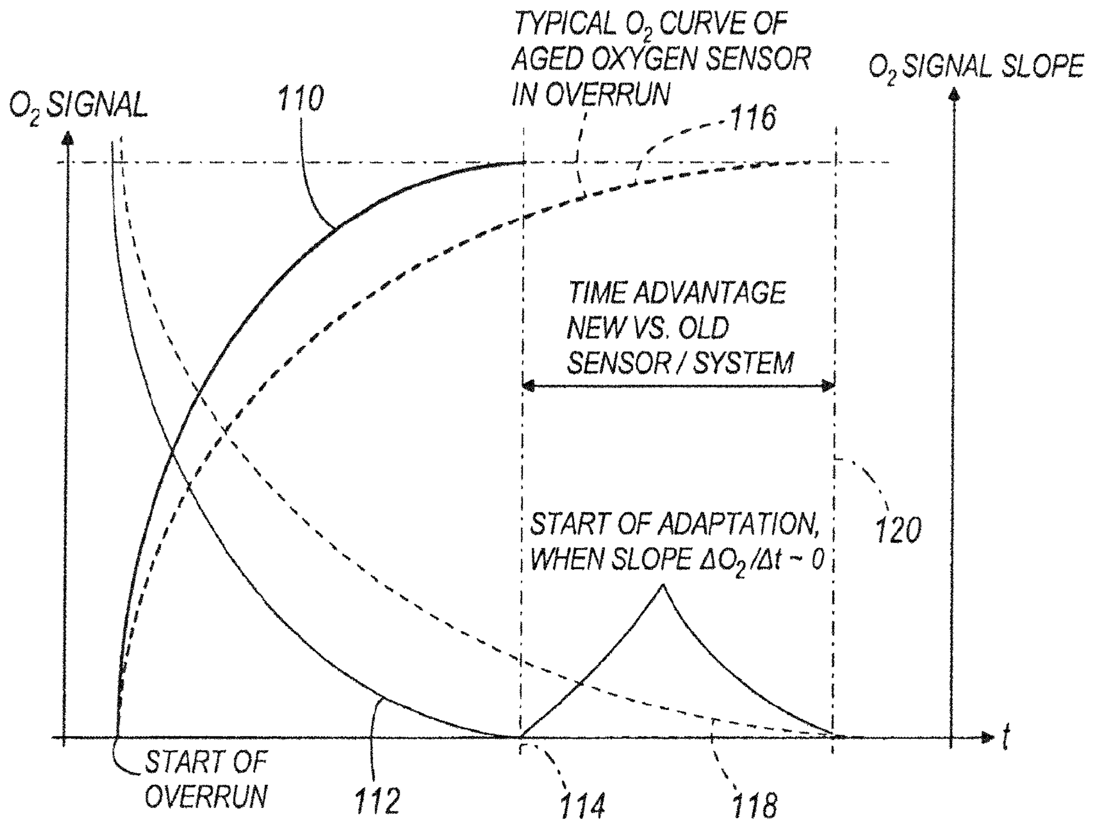
FIG. 5 graphically illustrates the behavior of an O2 sensor and adaptation of one embodiment of the invention.

FIG. 5 illustrates an improved O2 sensor calibration or adaptation strategy. In the illustrated technique or strategy, adaptation is delayed until ECU detects that the change in oxygen level (as measured by the O2 sensor) over time is zero or near zero. The signal behavior of a new sensor is represented by lines 110 and 112. Line 112 represents the change in the measured oxygen level over time ($\Delta O2/\Delta t$) for a new sensor. Line 114 represents the start time of adaptation for a new sensor. The signal behavior for an aged sensor is represented by lines 116 and 118. Line 118 represents the change in oxygen level over time ($\Delta O2/\Delta t$) for the aged sensor. The adaptation start time the aged sensor is represented by line 120. The difference or gap between the adaptation start times (114 and 120) represents an amount of extra time that an aged sensor takes to achieve a correct O2 reading. Thus FIG. 5 illustrates (unlike FIG. 3 and FIG. 4) that the adaptation strategy adjusts and starts the signal compensation process based on the sensor behavior instead of a predetermined amount of purge gas. In other words, when the ECU determines that the O2 sensor is reading a constant level of oxygen (or when the slope of the oxygen sensor signal is approximately or substantially zero) it starts the compensation process. This provides a time advantage for new sensors over prior compensation strategies and has a benefit of automatically self-adapting to changes in signal behavior.

The compensation process or calculation of a compensation or correction factor may be accomplished in a variety of ways. One compensation technique includes performing the calculation as shown in Equation 1, below, to determine a correction factor.

$$\text{Correction Factor} = 20.95\%/\text{measured oxygen level (at the time that } \Delta O2/\Delta t = 0) \qquad \text{Eqn. 1.}$$

Once the calculation factor is determined, it is applied to subsequent O2 sensor readings by multiplying the readings by the factor. In many implementations, the correction factor is also analyzed to assess its quality. A quality assessment is often required since compensation depends on the environmental conditions where the overrun event happens. For example, if an overrun occurs when a vehicle is in a tunnel, the correction factor is different when the overrun occurs in an unrestricted location (which has cleaner air as compared to the air in the tunnel). Depending on the exact circumstances, the differences can be large. In some embodiments, the ECU recognizes such changes (e.g., by executing appropriate software) in the correction factor and filters the correction factor to avoid a situation where an incorrect change in the correction factor occurs or an incorrect correction factor is used.

As can be seen from the above, certain embodiments of the invention provide a more reliable and self-adapting methodology to initiate O2-sensor compensation. Additionally, embodiments of the invention help address challenges associated with automatic transmission control states and help compensate for unpredicted changes of the sensor response behavior due to low exhaust flow speeds, as was discussed above. The time between the start of exhaust gas purging and the start of the O2 adaptation process can also be used to determine the dynamic response time of an O2 sensor. The dynamic response time provides an indication of the level of sensor clogging (e.g., by soot).

Various features and advantages of the invention are set forth in the following claims.

What is claimed is:

1. A system for compensating for changes in behavior of an oxygen sensor, the system comprising:

an oxygen sensor configured to produce an output indicative of an oxygen level in an exhaust stream produced by an internal combustion engine;

an electronic control unit configured to cause an internal combustion engine to operate in an overrun mode and to receive the output of the oxygen sensor, the electronic control unit programmed to determine whether a change in oxygen level over time is approximately zero, and when the change in oxygen level is approximately zero determine a compensation factor for the oxygen sensor.

2. A system as claimed in claim 1, further comprising a mass air flow sensor configured to produce an output indicative of an amount of oxygen in an intake manifold of the internal combustion engine.

3. A system as claimed in claim 1, wherein the electronic control unit is configured to control delivery of fuel to an engine.

4. A system as claimed in claim 1, wherein the electronic control unit is configured to determine whether a change in oxygen level over time is approximately zero by determining a signal slope of the output of the oxygen sensor.

5. A method of compensating for changes in behavior of an oxygen sensor, the method comprising:

measuring the oxygen level of an exhaust stream produced by the internal combustion engine;

causing the internal combustion engine to operate in an overrun mode;

monitoring a change in the oxygen level over time; and when the change in the oxygen level over time is approximately zero, determining a compensation factor for the oxygen sensor.

6. A method as claimed in claim 5, further comprising positioning an oxygen sensor in an exhaust manifold of an internal combustion engine.

7. A method as claimed in claim 5, wherein monitoring a change in the oxygen level over time includes determining a signal slope of the output of the oxygen sensor.

8. A method of compensating for changes in behavior of an oxygen sensor that measures an oxygen level in an exhaust manifold of an internal combustion engine, the oxygen sensor generating an electric output correlated to the measured oxygen level, the method comprising, providing the electric output of the oxygen sensor to an electronic control unit;

causing the internal combustion engine to operate in an overrun mode;

determining, with the electronic control unit, when a change in oxygen level, as measured by the O2 sensor, over time is substantially zero;

determine a compensation factor for the oxygen sensor when the change in oxygen level is determined to be substantially zero.

9. A method as claimed in claim 8, wherein determining when a change in the oxygen level over time is substantially zero includes determining a signal slope of the output of the oxygen sensor.

10. A method of determining the response time of an O2 sensor, the method comprising:

determining the start time of an exhaust gas purge process during engine overrun;

determining whether a change in oxygen level over time is approximately zero; and determining the end time of the exhaust gas purge process when the change in oxygen level is approximately zero.

* * * * *